US010899616B2

(12) United States Patent
Sasmaz et al.

(10) Patent No.: US 10,899,616 B2
(45) Date of Patent: Jan. 26, 2021

(54) SYNTHESIS OF METAL OXYNITRIDES USING FLAME SPRAY PYROLYSIS

(71) Applicant: UNIVERSITY OF SOUTH CAROLINA, Columbia, SC (US)

(72) Inventors: Erdem Sasmaz, Columbia, SC (US); Nicole Cordonnier, Dayton, OH (US); Benjamin Meekins, Columbia, SC (US); Jennifer Naglic, Chapin, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 16/851,311

(22) Filed: Apr. 17, 2020

(65) Prior Publication Data

US 2020/0399126 A1 Dec. 24, 2020

Related U.S. Application Data

(60) Provisional application No. 62/864,136, filed on Jun. 20, 2019.

(51) Int. Cl.
*C01B 21/082* (2006.01)
(52) U.S. Cl.
CPC ................. *C01B 21/0821* (2013.01)
(58) Field of Classification Search
None
See application file for complete search history.

(56) References Cited

U.S. PATENT DOCUMENTS 5,958,361 A * 9/1999 Laine ............ B82Y 30/00
423/593.1
2017/0073229 A1* 3/2017 Kageyama ........... C01G 23/006

OTHER PUBLICATIONS

Blanco et al.; Structural Changes in ZrOxNy/ZrO2 coatings Deposited Through Spray Pyrolysis Nitriding; Revista Mexicana deFisica ; 60, 233-242 (Year: 2014).*
Ahmed, et al. "A review of metal oxynitrides for photocatalysis" *Inorg. Chem. Front.* 3 (2016) pp. 578-590.
Fuertes, A. "Metal oxynitrides as emerging materials with photocatalytic and electronic properties" *Mater. Hor.* 2 (2015) pp. 453-461.
Fujishima, et al. "Mechanism of the current doubling effect. I. The ZnO photoanode in aqueous solution of sodium formate" *Bull. Chem. Soc. Jpn.* 54 (1981) pp. 1671-1674.
Kammler, et al. "Flame synthesis of nanoparticles" *Chem. Eng. Tech.* 24 (2001) pp. 583-596.
Kennedy, et al. "Combustion synthesis and photoelectrochemical characterization of gallium zinc oxynitrides" *J. Mater. Res.* 33 (2018) pp. 1-8.

(Continued)

*Primary Examiner* — Guinever S Gregorio
(74) *Attorney, Agent, or Firm* — Dority & Manning, P.A.

(57) ABSTRACT

The present disclosure is directed to methods for producing metal oxynitrides using flame synthesis. Embodiments of the disclosure may provide advantages over prior synthesis techniques by reducing synthesis time. Additionally, methods and systems disclosed herein may achieve better incorporation of nitrogen atoms into the oxide structure due in part to the higher homogeneity of flame made particles and ability to control the reaction environment.

17 Claims, 3 Drawing Sheets

(56) References Cited

OTHER PUBLICATIONS

Koirala, et al. "Synthesis of catalytic materials in flames: opportunities and challenges" *Chem. Soc. Rev.* 45 (2016) pp. 3053-3068.
Lin, et al. "Low resistance ohmic contacts on wide band-gap GaN" *Appl. Phys. Lett.* 64 (1994) pp. 1003-1005.
Mädler, et al. "Controlled synthesis of nanostructured particles by flame spray pyrolysis" *J. Aerosol Sci.* 33 (2002) pp. 369-389. (Abstract only).
Morikawa, et al. "Band-gap narrowing of titanium dioxide by nitrogen doping" *Jap. J. Appl. Phys.* 40 (2001) pp. L561-L563.
Mueller, et al. "Nanoparticle synthesis at high production rates by flame spray pyrolysis" *Chem. Eng. Sci.* 58 (2003) pp. 1969-1976.
Oshima, et al. "Epitaxial growth of wide-band-gap $ZnGa_2O_4$ films by mist chemical vapor deposition" *J. Cryst. Growth* 386 (2014) pp. 190-193.
Strobel, et al. "Flame aerosol synthesis of smart nanostructured materials" *J. Mater. Chem.* 17 (2007) pp. 4743-4756.
Strobel, et al. "Aerosol flame synthesis of catalysts" *Adv. Powd. Tech.* 17 (2006) pp. 457-480.
Trommer, et al. "History of Flame Spray (FS) Technique" *Flame Spray Technology: Method for Production of Nanopowders* Springer (2015) pp. 7-10.
Varma, et al. "Solution Combustion Synthesis of Nanoscale Materials" *Chem. Rev.* 116 (2016) pp. 14493-14586.
Yu, et al. "Synthesis of new bimetallic transition metal oxynitrides V-Me-ON (Me=Mo and W) by temperature-programmed reaction" *J. Solid State Chem.* 116 (1995) pp. 205-207.

\* cited by examiner

SYNTHESIS OF METAL OXYNITRIDES USING FLAME SPRAY PYROLYSIS

CROSS REFERENCE TO RELATED APPLICATIONS

The present application claims priority to U.S. Provisional Application No. 62/864,136, having the filing date Jun. 20, 2019, which is incorporated herein in its entirety by reference.

BACKGROUND

Metal oxynitrides have been of interest due to the reduction of band gap energy with the incorporation of nitrogen into the metal oxide structure. Nitrogen atoms are less electronegative than oxygen atoms, thereby the nitrogen bonds require less energy to break compared to oxygen bonds which leads to a decrease in band gap energy. Metal oxynitrides can incorporate various active metals into the oxynitride structure to improve the activity in reactions such as photocatalytic water splitting and redox reactions in batteries. Oxynitrides are less stable when compared to oxides, so synthesis conditions must be carefully selected to result in oxynitride formation.

Metal oxynitrides are often synthesized in a two-step process using wet chemistry methods which require long reaction times. Often, metal oxide materials are heated to temperatures in excess of 900° C. and ammonia gas flow is maintained over the material to form oxynitride compounds in a process known as thermal ammonolysis. One main challenge of the ammonolysis reaction is minimizing the ammonia gas decomposition in the high temperature range necessary for the reaction to occur before the gas comes into contact with the oxide. Reaction times in this synthesis technique are often long—up to dozens of hours—as well. In addition, the use of pure ammonia gas requires specialized equipment and safety procedures. More recently, combustion synthesis has been utilized to form metal oxynitrides. During combustion synthesis, the precursors for the active metals and nitrogen source are all mixed to form a solution; urea is a common nitrogen source. The precursor solution is then heated past the decomposition temperature of the nitrogen source to form a powder. The combustion synthesis method greatly reduces reaction time compared to thermal ammonolysis, taking only about 30 minutes to complete the reaction. However, it does not allow fine control of the reaction environment during synthesis, thereby limiting the formation of desired morphologies.

Flame synthesis is a method of synthesizing catalysts quickly in a flame and often eliminates the need for post synthesis processing like calcination or filtration. Catalysts synthesized in flames can have unique morphologies not possible through traditional synthesis mechanisms which often lead to high activity and high thermal stability. This is due to the non-thermodynamically favorable structures formed in the flame. A reliable method of quickly synthesizing catalysts would greatly reduce catalyst production time, and highly active catalysts with thermodynamically unfavorable morphologies not possible during traditional impregnation methods can be achieved through flame synthesis.

Needed in the art are flame synthesis methods—as opposed to combustion and ammonolysis methods—for forming metal oxynitrides using a controlled flame environment that can lead to improvements. Flame synthesis may have the potential to achieve better incorporation of nitrogen atoms into the oxide structure due to the high homogeneity of flame-made particles, allowing one to control the reaction environment. Flame synthesis has also been shown to be viable for industrial scale synthesis so large quantities of metal oxynitrides could be produced in a reasonable time. For example, flame synthesis processes are currently used in industry to produce nanoparticulate $TiO_2P25$, as well as fumed silica. Multiple industrial companies, such as DuPont and Degussa, now use flame synthesis processes to produce new nanomaterials.

SUMMARY OF THE INVENTION

In general, the present invention is directed to methods for producing metal oxynitrides using flame synthesis. Embodiments of the disclosure may provide advantages over prior synthesis techniques by reducing synthesis time. Additionally, methods and systems disclosed herein may achieve better incorporation of nitrogen atoms into the oxide structure due, in part, to the higher homogeneity of flame-made particles and the ability to control the reaction environment.

An aspect of the present disclosure can include methods for synthesizing metal oxynitrides that incorporate one or more metals in the oxynitride composition.

Another aspect of the present disclosure can include flame spray synthesis configurations. For example, precursor metals used to form the product oxynitride can be provided to the flame spray system in the form of a solution or may be delivered as a vapor by flowing a combustible gas through the solution containing the precursor metal(s).

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures.

Figure 1:
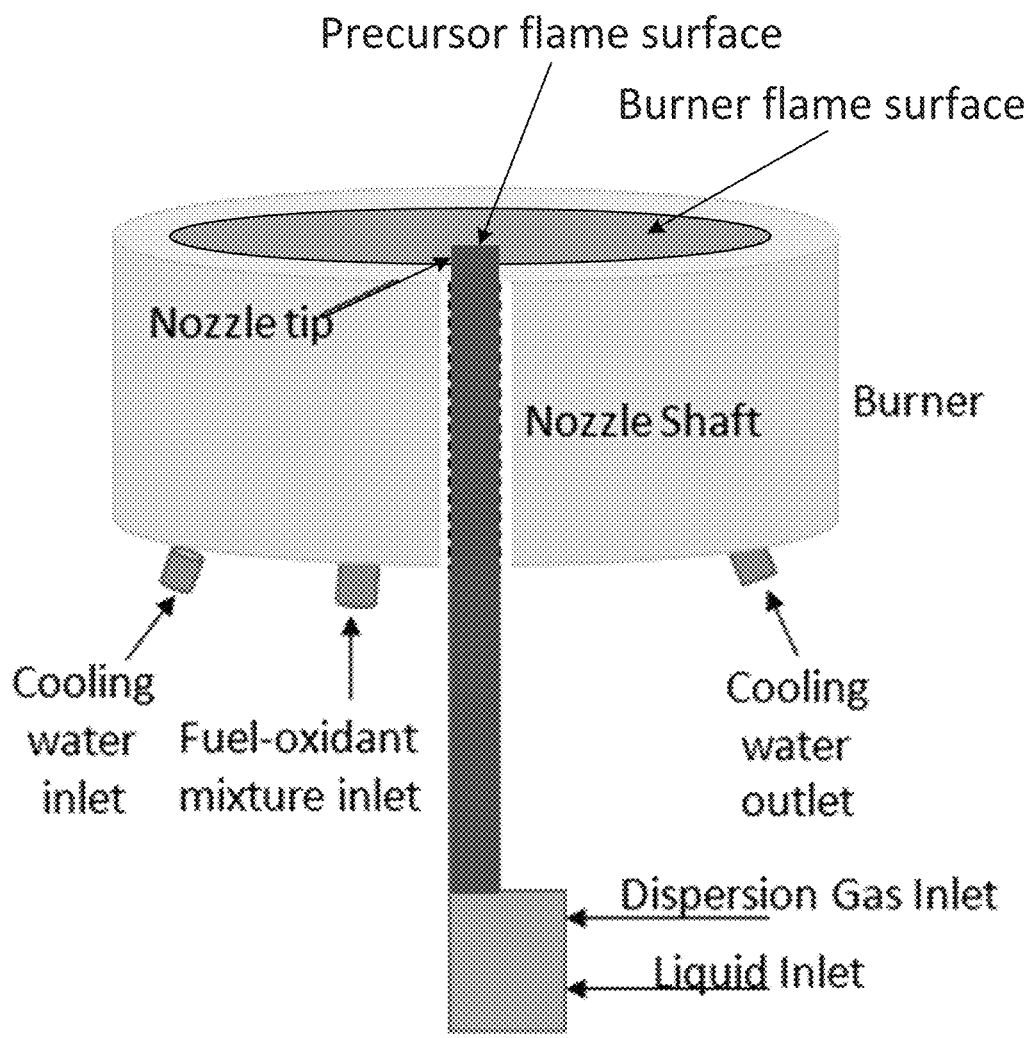
FIG. 1 illustrates an example flame pyrolysis system in accordance with example embodiments of the disclosure.

Repeat use of reference characters in the present specification and drawings is intended to represent the same or analogous features or elements of the present invention.

DETAILED DESCRIPTION

Reference will now be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only and is not intended as limiting the broader aspects of the present invention, which broader aspects are embodied exemplary constructions.

Generally speaking, the present invention is directed to methods for the synthesis of a metal oxynitride using flame synthesis. Embodiments of the disclosure may provide advantages over prior synthesis techniques by reducing synthesis time. Additionally, methods and systems disclosed herein may achieve better incorporation of nitrogen atoms into the oxide structure due, in part, to the higher homogeneity of flame-made particles and the ability to control the reaction environment.

An embodiment of the disclosure can include a method for synthesizing a metal oxynitride using flame synthesis, the method including providing a precursor solution containing at least one precursor and a solvent to a flame spray pyrolysis system and exposing a portion of the solution to a flame. Homogeneous solutions are preferred, though mixtures, such as dispersions, suspensions, or emulsions, may also be used as the precursor solution. The precursor solution can be made homogeneous by altering the precursor type, solvent type, and precursor concentration. Aspects of the at least one precursor can include a chemical composition, such that the precursor can include, a chemical, a metal, and/or an ion. Aspects of the flame spray pyrolysis system can include one or more inlets, controllers, nozzles, burners or other features described in further detail herein.

As an example for illustration, a method for synthesizing a metal oxynitride in accordance with the disclosure can include providing a solution containing a precursor to a flame spray pyrolysis system by using a pump to flow the solution at a feed rate to a flame present in the flame spray pyrolysis system. In general, flame spray pyrolysis systems in accordance with the disclosure may include a precursor flame optionally supported by a burner flame.

The precursor flame can be maintained and/or adjusted using a fuel inlet for supplying fuel which can be any flammable liquid (e.g., toluene, octane, ethanol) mixed with metal precursors (e.g., acetylacetonates) and an oxidant (e.g., oxygen) to achieve substantially continuous combustion during use. The precursor flame can be supported by a burner flame using a fuel inlet for supplying burner fuel, such as a combustible gas (e.g., methane) and burner oxidant (e.g., oxygen). Since flame synthesis occurs during combustion, reaction can be achieved quickly and the product metal oxynitride recovered in some implementations without further processing or purification.

An example aspect of maintaining either the burner flame or the precursor flame can include a controllable equivalence ratio. For embodiments of the disclosure, the equivalence ratio of the burner flame or precursor flame can be varied by adjusting the fuel to oxidant ratio. Generally, implementations of the disclosure can have an equivalence ratio describing the fuel-to-oxidizer ratio relative to the stoichiometric fuel-to-oxidizer ratio in the burner and/or the precursor flame of about 0.25 to about 4.0, such as about 0.5 to about 3.5, or about 1.0 to about 2.0. Adjusting the equivalence ratios can be accomplished in a variety of ways. For example, pressure gauges may be used on separate tanks containing the fuel and the oxidant to adjust flow rates for each component.

For implementations of the disclosure, the burner fuel can include any flammable compound that can be present as a gas at standard conditions (e.g., room temperature and atmospheric pressure), such as methane ($CH_4$) and/or hydrogen ($H_2$). In some implementations, the fuel may include a mixture of flammable gases.

For implementations of the disclosure, the precursor flame fuel may include any combustible material in the form of a solution or mixture that can be aerosolized to form a combustible vapor. Example combustible materials include linear or branched alkanes, alkenes, alcohols, ketones, and aryl compounds. Several non-limiting examples of combustible material include: acetic acid; acetone; acetonitrile; benzene; n-butanol; butyl acetate; carbon tetrachloride; chloroform; cyclohexane; 1,2-dichloroethane; dichloromethane; dimethylformamide; dimethyl sulfoxide; dioxane; ethanol; ethyl acetate; diethyl ether; heptane; hexane; methanol; methyl-t-butyl ether; 2-butanone; pentane; n-propanol; isopropanol; diisopropyl ether; tetrahydrofuran; toluene; trichloroethylene; water; xylene; or any combination thereof. Additionally, for some applications, mixtures of hydrocarbons, such as are present in gasoline or kerosene, may be used as the precursor flame fuel.

Several non-limiting examples of the oxidant can include molecular oxygen ($O_2$) and air. Additionally, chemical precursors that generate any of the preceding may be used as the oxidant. In an example implementation, the oxidant can include a gaseous mixture with about 5% to about 100% oxygen by volume.

In certain embodiments, providing the solution to the flame spray pyrolysis system can be conducted substantially continuously using a feeding system. The feeding system can include a reservoir containing the solution that includes the precursor. A flow system including a controller can then be used to provide the solution (e.g., by pumping the liquid solution) at a controllable flowrate and/or pressure to the flame pyrolysis system. In general, the flowrate describes a volume of the solution entering the flame spray pyrolysis system over a time period. Though not intended to be limiting, example flowrates that may be used in accordance with the disclosure include a flowrate between about 10 µL/min to about 50 mL/min, such as about 50 µL/min to about 40 mL/min, 100 µL/min to about 30 mL/min, or 500 µL/min to about 25 mL/min. The precursor solution can be sprayed (e.g., using a nozzle tip) to achieve a controlled pressure drop. Though not intended to be limiting, example pressure drops that may be used in accordance with the disclosure include a pressure drop between about 0 bar to about 5 bar, such as about 0 bar to about 3 bar, 0.5 bar to about 2.5 bar, or 1 bar to about 2 bar.

The metal oxynitrides of the disclosure can be composed of a single metal, two metals, or three metals, as well as oxygen and nitrogen. Several non-limiting examples of metals that may be included in the precursors used to form the metal oxynitrides can include: gallium (Ga); zinc (Zn); tantalum (Ta); titanium (Ti); zirconium (Zr); lanthanum (La); magnesium (Mg); calcium (Ca); strontium (Sr); barium (Ba); niobium (Nb); yttrium (Y); cerium (Ce); vanadium (V); molybdenum (Mo); tungsten (W); iron (Fe); praseodymium (Pr); neodymium (Nd); europium (Eu); aluminum (Al); lithium (Li); sodium (Na); manganese (Mn); scandium (Sc); and beryllium (Be).

In some implementations, such as forming a metal oxynitride composed of a single metal, all of the at least one precursor can include the same metal. For example, a method for forming a metal oxynitride composed of Ga can include providing a solution containing one or more precursors all of which only include the metal Ga to a flame spray pyrolysis system and exposing a portion of the solution to a flame (e.g., to ignite or combust the solution). In this example, while all of the precursors may only include one metal (e.g., Ga) that is not intended to limit or otherwise preclude the use of different precursors so long as each precursor contains the same metal. For instance, precursors having different Ga oxidation states, anions, or other chemical characteristics may be used in accordance with the disclosure to form a metal oxynitride composed of a single metal, so long as no other metals are present in the precursor or in the solution.

As an example of other chemical characteristics, each precursor may include the metal in a molecular form, rather than the elemental form. Several examples of the molecular form in accordance with this disclosure can include: nitrates; nitrate hydrates; chlorides; chloride hydrates; acetylacetonates; acetates; iodides; oxides; nitrides; phosphides; sulphates; sulphides; perchlorates; ethylhexanoates; propoxides; butoxides; carbonates; pentanedionates; hexonates; and naphthenates.

For implementations intended to produce a bimetallic oxynitride that includes two metals, the solution can include at least two precursors: A first precursor that includes a first metal, and a second precursor that includes a second metal. In general, the first metal and the second metal should be different from one another (e.g., the first metal is different from the second metal). In implementations intended to produce a trimetallic oxynitride that includes three metals, the solution can further include a third precursor that includes a third metal different from the first metal and the second metal.

In certain implementations, providing the solution containing at least one precursor and the solvent to the flame spray pyrolysis system can include flowing a fraction of fuel in the form of a gas through the precursor solution. During this process some of the precursor will be aerosolized or transferred into the vapor phase to form a precursor saturated vapor that can then be ignited by exposure to the flame.

In some embodiments, a preheating stem may be included by heating the solution containing the precursor.

For certain embodiments, the solution can further contain a nitrogen compound such as urea, cyanamide, dicyanamide, melamine, or a combination thereof. Generally, the nitrogen compound is characterized as having more nitrogen atoms than other elements so that the empirical formula of the nitrogen compound can be defined as the nitrogen having a basis of 1 and all other elements being a fraction of 1 (e.g., less than 1).

Example 1

Example 1 provides exemplary embodiments that may be understood in conjunction with the Drawings and Description provided herein.

A gallium-zinc oxynitride ($Ga_xZn_{1-x}O_yN_{1-y}$) material was synthesized as a proof of concept. Gallium nitrate, zinc nitrate, and urea precursors were dissolved in ethanol to form a solution with a molarity of 0.03 M total with a 1:1:10 mole ratio, respectively. The precursor solution was then injected into the flame spray pyrolysis experimental setup with the burner stoichiometric ratio equal to 1.0, the total flow to the burner equal to 12 L/min, and the oxygen dispersion gas flow equal to 8 L/min. The flowrate of the liquid precursor was maintained at 0.85 mL/min of solution. The oxynitride particles were collected on a glass fiber filter paper with the help of a vacuum pump. X-ray diffraction (XRD) data (FIG. 2A) shows the presence of ZnO particles as shown by the peaks marked by stars in the spectra. The three strongest peaks in the spectra at 2-theta values of 31.8, 34.4, and 36.3 correspond well to the (100), (002), and (101) planes in ZnO according to JCPDS no 36-1451. The broad peak at 2-θ of 18 can be attributed to small amounts of silica in the sample from the filter paper on which the oxynitride was collected.

Figure 2A:
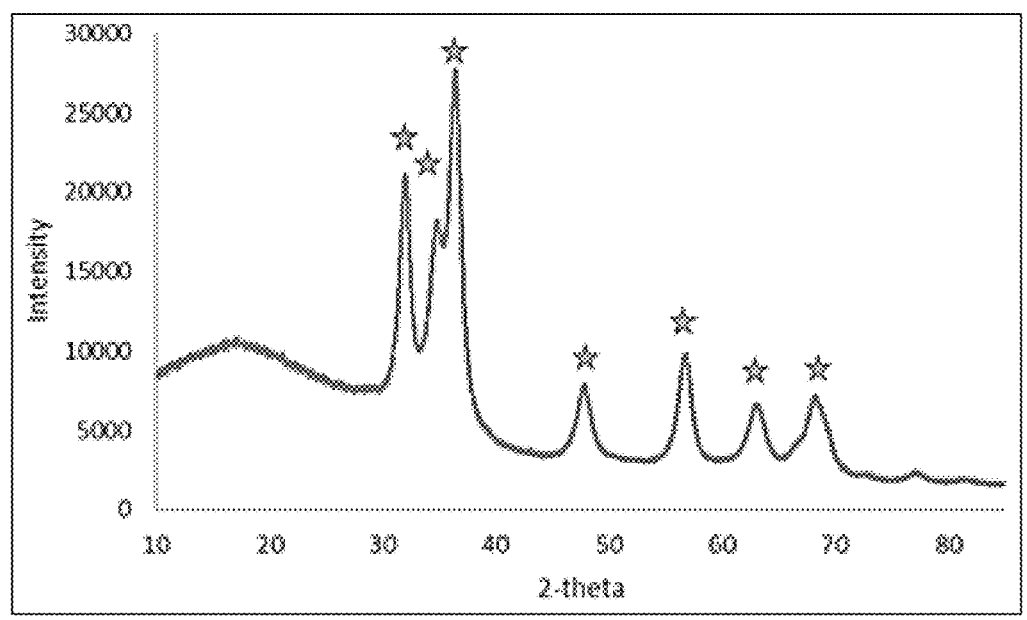
FIGS. 2A-2D illustrate graphs displaying data in accordance with example embodiments of the disclosure.

Referring now to FIG. 2A, the graph illustrates XRD data for a gallium zinc mixed metal oxynitride sample formed as described in Example 1. β gallium oxide ($Ga_2O_3$) peaks in accordance with the JCPDS database are not present in the spectra indicating the lack of crystalline gallium oxide in the sample or the abundance of crystalline ZnO in the oxynitride. The band gap of the sample was determined using Kubelka-Munk equation with diffuse reflectance measurements, as shown in FIG. 2B.

Figure 2B:
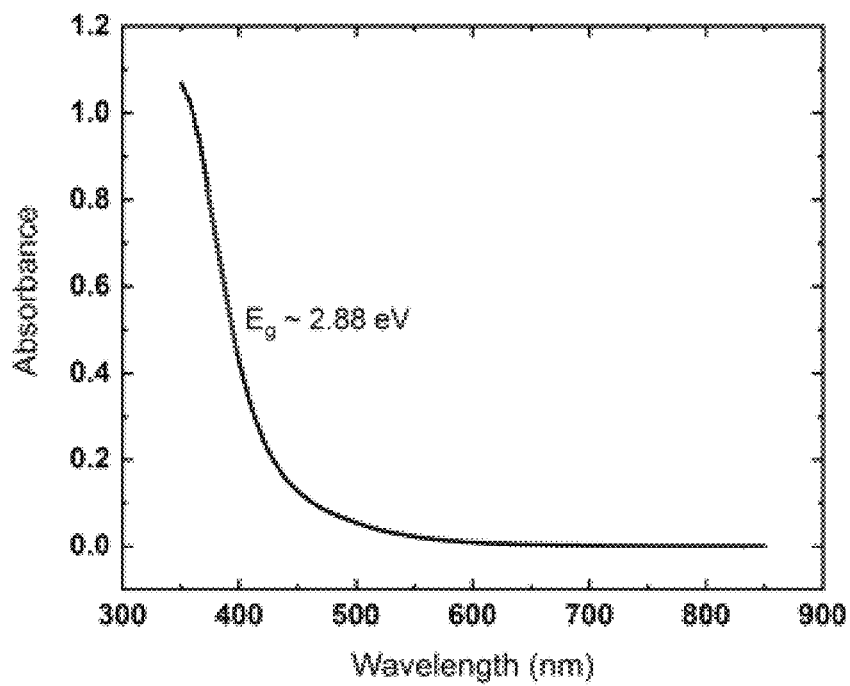

Referring now to FIG. 2B, the graph illustrates an absorbance plot for the gallium zinc mixed oxynitride sample from which the band gap was estimated. The band gap of $Ga_xZn_{1-x}O_yN_{1-y}$ was found to be 2.88 eV, which is lower than that of ZnO (>3.0 eV), GaN (3.4 eV) and $ZnGa_2O_4$ (>4.0 eV). The decrease in band gap energy compared to ZnO indicates the incorporation of nitrogen into the crystal lattice, leading to an upward, more negative shift of the valence band of the semiconductor.

Figure 2C:
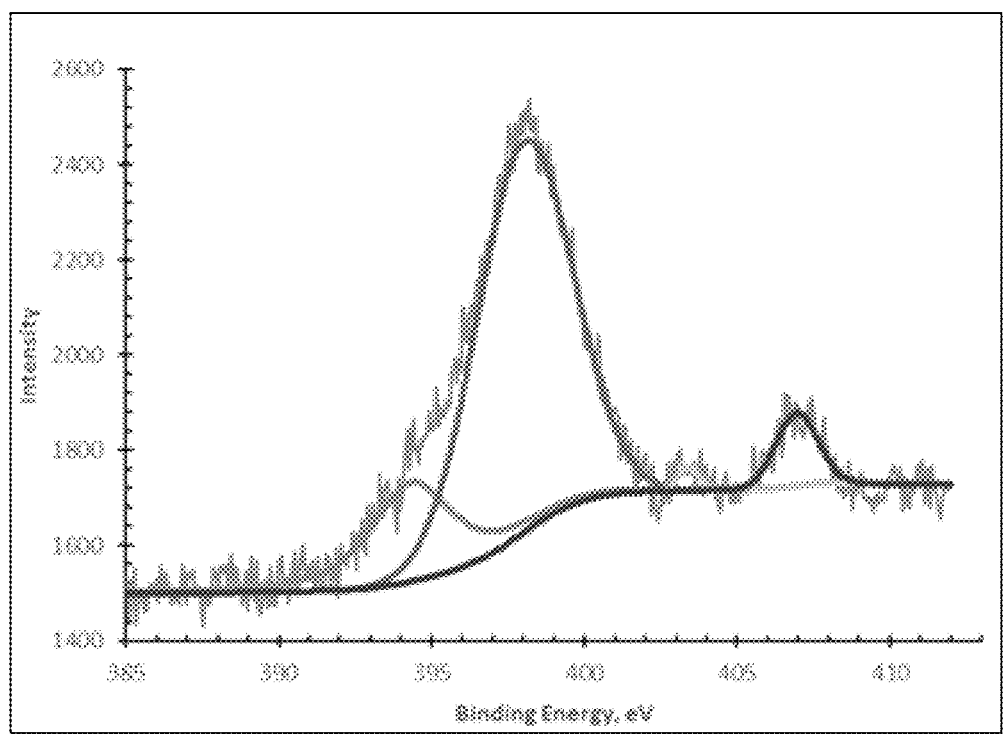

Referring now to FIG. 2C, the graph illustrates nitrogen XPS spectra for the gallium zinc mixed oxynitride. As shown in the graph, the N 1s core level spectra indicated that the peaks at around 397 eV can be assigned to metal nitride species ($N^{3-}$). Some of the nitrogen in the sample can be attributed to inactive nitrates, as seen by the peak at 407 eV. XPS data also revealed the presence of $Ga^{+3}$ in the sample despite the lack of gallium seen in XRD, shown in FIG. 2D. Based on the XPS data, it can be concluded that a gallium zinc oxynitride structure was formed via flame synthesis.

Figure 2D:
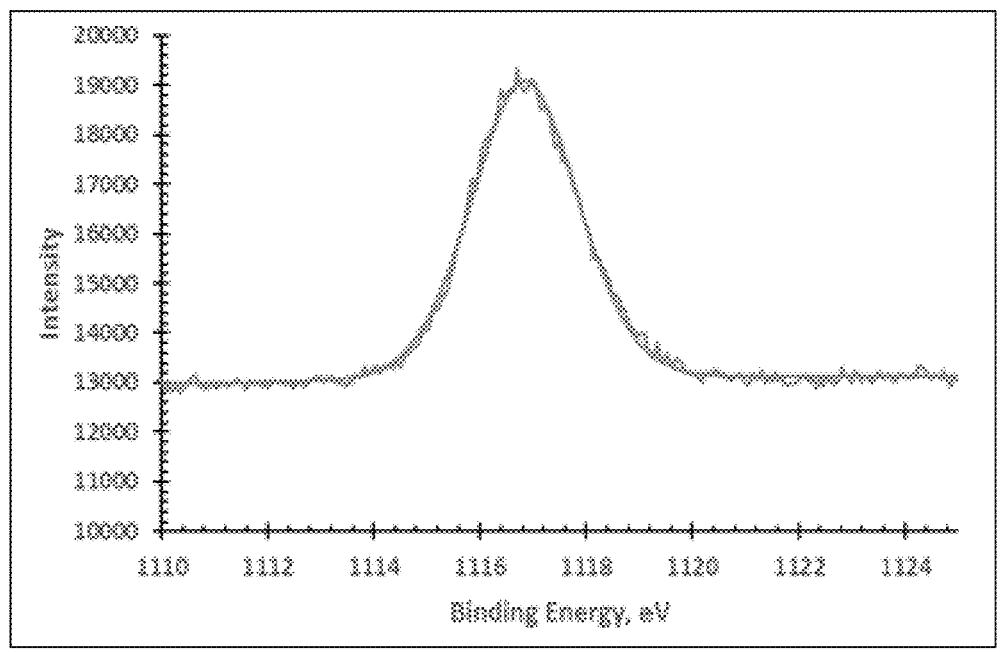

Referring now to FIG. 2D, the graph illustrates gallium XPS spectra for the gallium zinc mixed oxynitride.

Results and methods provided in the drawings and described herein are meant to be exemplary and are not intended to limit the methods and compositions to modifications or alternatives as would be understood by a person of ordinary skill in the field of endeavor.

The invention claimed is:

1. A method for synthesizing a metal oxynitride using flame synthesis, the method comprising:
   providing a solution containing at least one precursor and a solvent to a flame spray pyrolysis system,
   exposing a portion of the solution to a precursor flame generated by the flame spray pyrolysis system, and
   recovering the metal oxynitride without further processing,
   wherein each of the at least one precursor comprises a metal, and wherein the flame spray pyrolysis system comprises:
   a burner fuel inlet for providing a burner fuel and a burner oxidant to form a burner flame characterized by an equivalence ratio to support the precursor flame.

2. The method as in claim 1, wherein the burner fuel comprises a hydrocarbon, hydrogen gas, or both with a flowrate of about 0.01 L/min to about 15 L/min.

3. The method as in claim 1, wherein the burner oxidant is a gaseous mixture comprising 5-100% oxygen.

4. The method as in claim 1, wherein the solvent comprises at least one flammable liquid.

5. The method of claim 1, wherein the solution is provided at a flowrate between about 10 μL/min to about 50 mL/min.

6. The method of claim 1, wherein the flame spray pyrolysis system further comprises a precursor inlet for providing a precursor oxidant to the precursor flame.

7. The method as in claim 6, further comprising:
   providing the precursor oxidant at a pressure drop of 0-5.0 bar across the flame spray pyrolysis system.

8. The method of claim 1, wherein the metal includes one of the group consisting of: gallium (Ga), zinc (Zn), tantalum (Ta), titanium (Ti), zirconium (Zr), lanthanum (La), magnesium (Mg), calcium (Ca), strontium (Sr), barium (Ba), niobium (Nb), yttrium (Y), cerium (Ce), vanadium (V), molybdenum (Mo), tungsten (W), iron (Fe), praseodymium (Pr), neodymium (Nd), europium (Eu), aluminum (Al), lithium (Li), sodium (Na), manganese (Mn), scandium (Sc), and beryllium (Be).

9. The method of claim 1, wherein all of the at least one precursor comprises the same metal, and wherein the metal oxynitride comprises one metal.

10. The method of claim 1, wherein the solution contains at least two precursors: a first precursor and a second precursor, and wherein the first precursor comprises a first metal and the second precursor comprises a second metal, and wherein the first metal is different from the second metal.

11. The method of claim 10, further comprising a third precursor comprising a third metal, and wherein the third metal is different from both the first metal and the second metal.

12. The method of claim 1, further comprising:
providing the burner fuel and the burner oxidant at the equivalence ratio between about 0.25 to about 4.0, wherein the equivalence ratio characterizes the burner fuel to the burner oxidant ratio relative to a stoichiometric ratio of the burner fuel to the burner oxidant.

13. The method of claim 1, wherein providing the solution containing at least one precursor and the solvent into the flame spray pyrolysis system comprises:
flowing a fraction of the burner flame fuel, the burner flame oxidant, or both through the solution to form a precursor saturated vapor, wherein the precursor saturated vapor contains the solution in a gaseous phase or as an aerosol.

14. The method of claim 13, further comprising heating the solution.

15. The method of claim 1, wherein each of the precursors independently comprise the metal in a form from one of the group consisting of: nitrates, nitrate hydrates, chlorides, chloride hydrates, acetylacetonates, acetates, iodides, oxides, nitrides, phosphides, sulphates, sulphides, perchlorates, ethylhexanoates, propoxides, butoxides, carbonates, pentanedionates, hexonate and naphthenates.

16. The method of claim 1, wherein the solution further contains a nitrogen compound.

17. The method of claim 16, wherein the nitrogen compound comprises urea.

* * * * *